US012311687B2

(12) United States Patent
Tsuji et al.

(10) Patent No.: US 12,311,687 B2
(45) Date of Patent: May 27, 2025

(54) METHOD FOR PRODUCING A PRINTED MATERIAL

(71) Applicant: TORAY INDUSTRIES, INC., Tokyo (JP)

(72) Inventors: Yuichi Tsuji, Otsu (JP); Noboru Koshimizu, Otsu (JP); Takejiro Inoue, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 61 days.

(21) Appl. No.: 17/912,657

(22) PCT Filed: Mar. 25, 2021

(86) PCT No.: PCT/JP2021/012506
§ 371 (c)(1),
(2) Date: Sep. 19, 2022

(87) PCT Pub. No.: WO2021/193812
PCT Pub. Date: Sep. 30, 2021

(65) Prior Publication Data

US 2023/0146365 A1 May 11, 2023

(30) Foreign Application Priority Data

Mar. 26, 2020 (JP) ................................ 2020-055534
Dec. 23, 2020 (JP) ................................ 2020-213305

(51) Int. Cl.
*B41M 1/06* (2006.01)
*B41F 3/02* (2006.01)
(Continued)

(52) U.S. Cl.
CPC ................ *B41M 1/06* (2013.01); *B41F 3/02* (2013.01); *B41F 3/34* (2013.01); *B41F 3/48* (2013.01);
(Continued)

(58) Field of Classification Search
None
See application file for complete search history.

(56) References Cited

U.S. PATENT DOCUMENTS 4,286,008 A 8/1981 Reed et al.
2004/0160644 A1* 8/2004 Samworth ............ H04N 1/4055 358/3.09
(Continued)

FOREIGN PATENT DOCUMENTS

DE 19826974 A1 * 12/1999 ............. B41F 19/02
DE 102007039125 A1 * 2/2009 .......... B41F 13/0045
(Continued)

OTHER PUBLICATIONS

English language translation of DE 10 2007 039 125 A1 to Gebhardt et al. (Year: 2009).*
(Continued)

*Primary Examiner* — Leslie J Evanisko
(74) *Attorney, Agent, or Firm* — Birch, Stewart, Kolasch & Birch, LLP

(57) ABSTRACT

An object of the present invention is to provide a method for producing printed material on which active energy ray-curable ink is printed, the method being capable of improving print density without impairing gradation expressivity. The present invention is a method for producing printed material, the method including, in order: a transfer process of transferring ink to a transfer target surface of a substrate; and an impression process of bringing each of impression cylinders into contact with the transfer target surface to which the ink has been transferred, and at least one of the impression cylinders has a patterned impression part.

15 Claims, 5 Drawing Sheets

(51) Int. Cl.

| | |
|---|---|
| ***B41F 3/34*** | (2006.01) |
| ***B41F 3/48*** | (2006.01) |
| ***B41F 3/81*** | (2006.01) |
| ***B41M 1/04*** | (2006.01) |
| ***B41M 7/00*** | (2006.01) |

(52) U.S. Cl.
CPC ................. *B41F 3/81* (2013.01); *B41M 1/04* (2013.01); *B41M 7/0018* (2013.01)

(56) References Cited

U.S. PATENT DOCUMENTS

| | | | |
|---|---|---|---|
| 2018/0272782 | A1 | 9/2018 | Chen et al. |
| 2019/0039372 | A1 | 2/2019 | Kinoshita et al. |

FOREIGN PATENT DOCUMENTS

| | | | | | |
|---|---|---|---|---|---|
| EP | 0 537 890 | A1 | | 4/1993 | |
| EP | 1 422 062 | A2 | | 5/2004 | |
| EP | 3 351 602 | A1 | | 7/2018 | |
| GB | 2 458 493 | A | | 9/2009 | |
| JP | 51-144219 | U1 | | 11/1976 | |
| JP | 54-22214 | A | | 2/1979 | |
| JP | 2004-358788 | A | | 12/2004 | |
| JP | 2009-274432 | A | | 11/2009 | |
| JP | 2017-132895 | A | | 8/2017 | |
| JP | 2019-155828 | A | | 9/2019 | |
| WO | WO-2009107727 | A1 | * | 9/2009 | .............. B41F 19/02 |
| WO | WO-2009128368 | A1 | * | 10/2009 | .......... B41F 23/0443 |
| WO | WO-2017041896 | A2 | * | 3/2017 | .............. B41F 19/02 |

OTHER PUBLICATIONS

English language translation of WO 2017/041896 A2 to Voit et al. (Year: 2017).*

English language translation of DE 198 26 974 A1 to Drexler (Year: 1999).*

English language translation of WO 2009/128368 A1 to Matsubara et al. (Year: 2009).*

English language translation of WO 2009/107727 A1 to Eda et al. (Year: 2009).*

English language translation of JP 2009-274432 A to Eda et al., publication date Nov. 26, 2009. (Year: 2009).*

Extended European Search Report for European Application No. 21776554.4, dated Sep. 13, 2023.

International Search Report, issued in PCT/JP2021/012506, PCT/ISA/210, dated Jun. 15, 2021.

Written Opinion of the International Searching Authority, issued in PCT/JP2021/012506, PCT/ISA/237, dated Jun. 15, 2021.

Chinese Office Action and Search Report for Chinese Application No. 202180021924.8, dated Nov. 13, 2023.

* cited by examiner

METHOD FOR PRODUCING A PRINTED MATERIAL

TECHNICAL FIELD

The present invention relates to a method for producing a printed material.

BACKGROUND ART

With the increase in the global population, demand for flexible packaging used for packaging mainly for food and daily necessities is expected to continue to grow. The flexible packaging is said to be printing on a plastic film, performing lamination after the printing, and forming the film into a bag shape. In gravure printing, which is currently the mainstream in flexible packaging printing, a printed material with a vivid appearance can be obtained. However, because ink containing a large amount of solvent is used, a large amount of energy is required for drying of ink solvent and combustion treatment, thus causing a heavy environmental load. Furthermore, market needs are changing from conventional mass production and mass consumption to high-mix, low-volume manufacturing and short delivery times, and hence gravure printing, which has the advantage in large lot production, is now an expensive process requiring increased production costs due to costly plates and plate making. Therefore, attempts have begun in recent years to perform flexible packaging printing by using lithographic printing, which is inexpensive in terms of plate cost and plate making cost and is superior in terms of low-volume manufacturing and short delivery time (Patent Document 1).

Lithographic printing is a printing method widely used as a system for supplying a printed material at high speed, in large quantities, and at low cost. In addition, in recent years, there has been a demand for a reduction in volatile components contained in lithographic printing ink in order to deal with environmental issues. Therefore, the use of lithographic printing ink that is free from volatile components and is instantaneously curable with an active energy ray irradiation (hereinafter, active energy ray-curable lithographic printing ink) is in progress (Patent Document 2). In the flexible packaging printing, roll-to-roll printing is performed, and hence the quick-drying property of the ink is important. In addition to environmental advantages, active energy ray-curable lithographic printing using the active energy ray-curable lithographic printing ink has energy saving and high productivity because a drying process is shortened while no heat energy is used.

In general, the active energy ray-curable lithographic printing ink has high viscosity and a poor leveling property due to instantaneous curing, and the print density tends to be lower than that of existing gravure printing. When the ink supply amount is increased to increase the print density, adhesion to film material is reduced due to deterioration in printability such as dirt and an increase in thickness. Therefore, attempts have been made to reduce the unevenness of the surface of the ink layer by disposing a face leveling roll during a period from printing to curing (Patent Document 3).

PRIOR ART DOCUMENT

Patent Documents

Patent Document 1: Japanese Patent Laid-open Publication No. 2004-358788

Patent Document 2: Japanese Patent Laid-open Publication No. 2017-132895

Patent Document 3: Japanese Patent Laid-open Publication No. 2009-274432

SUMMARY OF THE INVENTION

Problems to be Solved by the Invention

According to the technique disclosed in Patent Document 3, there is an effect of improving the print density of a solid, but a halftone-dot portion becomes larger than the setting (hereinafter referred to as dot gain) to cause deterioration in gradation expressivity, such as the occurrence of tone jump in shadows and highlights.

Therefore, an object of the present invention is to provide a method for producing a printed material, which can improve print density by using active energy ray-curable ink without impairing gradation expressivity.

Solutions to the Problems

In order to solve the above problems, the present inventors disclose the invention of the following production method.

(1) A method for producing a printed material, the method including, in order: a transfer process of transferring ink to a transfer target surface of a substrate; and an impression process of bringing each of impression cylinders into contact with the transfer target surface to which the ink has been transferred, and at least one of the impression cylinders has a patterned impression part.

Furthermore, preferable aspects of the present invention include the followings.

(2) The method for producing a printed material according to (1) above, wherein an area of 80% or more of an upper surface of the patterned impression part corresponds to a solid transferred to the transfer target surface before the impression process.

(3) The method for producing a printed material according to (1) or (2) above, wherein impression pressure between the impression cylinder having the patterned impression part and an impression drum that faces the impression cylinder having the patterned impression part and sandwiches the substrate with the impression cylinder is 100 $N/cm^2$ or more and 700 $N/cm^2$ or less.

(4) The method for producing a printed material according to any one of (1) to (3) above, wherein a surface roughness Ra of the upper surface of the patterned impression part is 0.30 μm or less.

(5) The method for producing a printed material according to any one of (1) to (4) above, wherein a surface roughness Rz of the upper surface of the patterned impression part is 2.00 μm or less.

(6) The method for producing a printed material according to any one of (1) to (5) above, wherein surface free energy of the upper surface of the patterned impression part is 36 mN/m or more and 50 mN/m or less.

(7) The method for producing a printed material according to any one of (1) to (6) above, wherein the impression cylinder having the patterned impression part is a cylinder to which at least one selected from an offset printing plate, a flexographic printing plate, a resin letterpress, and a blanket is attached.

(8) The method for producing a printed material according to (7) above, wherein the offset printing plate is a waterless printing plate.

(9) The method for producing a printed material according to (7) or (8) above, wherein the impression part is an ink smoothing material pasted to the blanket.

(10) The method for producing a printed material according to any one of the above, the method further including an irradiation process of irradiating ink with the active energy ray after the transfer process and the impression process.

(11) The method for producing a printed material according to any one of (1) to (10) above, wherein the substrate is non-absorbent material.

(12) The method for producing a printed material according to (11) above, wherein the non-absorbent material is a film.

(13) The method for producing a printed material according to (12) above, wherein the film has a thickness of 5 μm or more and 50 μm or less.

(14) The method for producing a printed material according to any one of (1) to (10) above, wherein in the transfer process and the impression process, there is a single impression drum that faces a cylinder for transferring ink and an impression cylinder and sandwiches the substrate with the cylinder and the impression cylinder.

(15) The method for producing a printed material according to any one of (1) to (14) above wherein a value of a loss tangent (tan δ) of the ink at 25° C. and a measurement frequency of 10 rad/s in the impression process is 1.0 or more and 4.0 or less.

(16) The method for producing a printed material according to any one of (1) to (15) above, wherein the transfer process is performed a plurality of times, and ink used in at least the transfer process performed first of the plurality of times is at least one of white ink and anchoring ink.

(17) The method for producing a printed material according to any one of (1) to (16) above, the method further including: another transfer process after the impression process performed using the impression cylinder having the patterned impression part; and an impression process performed using an impression cylinder having another patterned impression part after the transfer process.

(18) The method for producing a printed material according to any one of (1) to (17) above, the method further including still another transfer process between the impression process performed using the impression cylinder having the patterned impression part and the irradiation process.

The present inventors also disclose the invention of the following printed material.

(19) A printed material, wherein a surface roughness Ra of a solid on the printed material is 0.10 μm or more and 0.50 μm or less, and a Young's modulus of an arbitrary ink film on the printed material is 3 GPa or more and 5 GPa or less.

Effects of the Invention

According to the method for producing a printed material in the present invention, selective smoothing of only a solid in the printed material can improve the print density without impairing gradation expressivity. Further, the selective smoothing can simply impart a wide range of print expression in which glossiness and matte properties coexist. Moreover, the obtained printed material exhibits excellent glossiness and abrasion resistance.

EMBODIMENTS OF THE INVENTION

Figure 1:
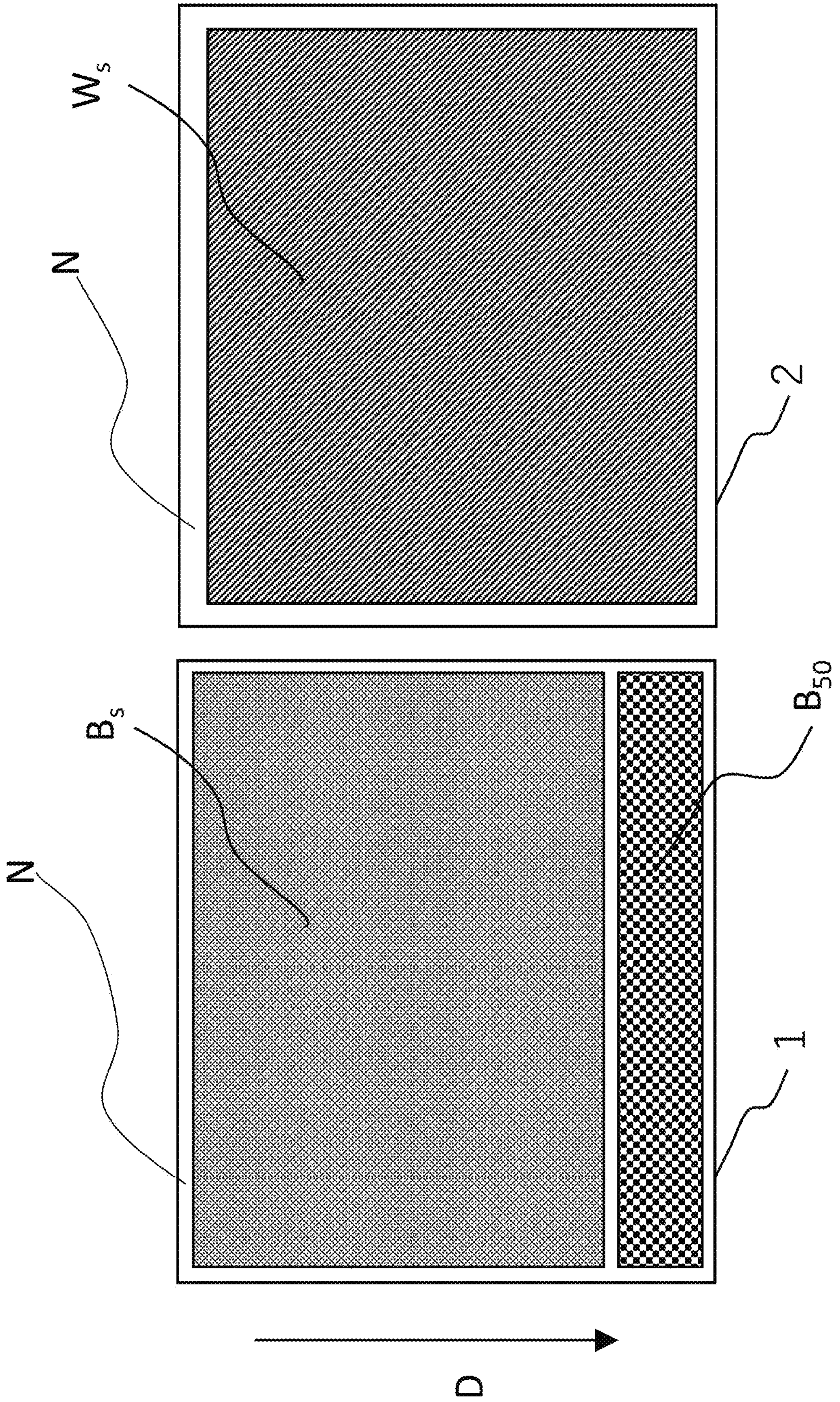
FIG. 1 is a view showing images of printing plates used in Printing methods 1, 2, and 3 in Examples.

Hereinafter, the present invention will be described specifically. In the present invention, "or more" means the same as or more than the numerical value indicated therein. Further, "or less" means the same as or less than the numerical value indicated therein. Moreover, "(meth)acrylate" is a generic term including acrylate and methacrylate.

The present invention is a method for producing a printed material, the method including, in order: a transfer process of transferring ink to a transfer target surface of a substrate; and an impression process of bringing each of impression cylinders into contact with the transfer target surface to which the ink has been transferred, and at least one of the impression cylinders has a patterned impression part.

(Substrate)

In the method for producing a printed material according to the present invention, as the substrate, it is possible to use coated paper such as art paper, coated paper, and cast paper, non-coated paper such as high-quality paper, newspaper paper, and Japanese paper, and non-absorbent materials such as synthetic paper, aluminum deposited paper, metal, and film. Among these, the non-absorbent material with low ink transferability and no ink permeation after transfer is preferable, and a film with low ink transferability is particularly preferable.

Examples of the film include polyesters such as polyethylene, polypropylene, polyethylene terephthalate, polybutylene terephthalate, and polylactic acid, polyamide, polyimide, polyalkyl (meth)acrylate, polystyrene, poly-α-methylstyrene, polycarbonate, polyvinyl alcohol, polyvinyl acetal, polyvinyl chloride, and polyvinylidene fluoride. These plastic films may be subjected to surface treatment such as burning treatment, adhesion-improving coating, and chemical vapor deposition.

The thickness of the film is preferably 5 μm or more, more preferably 10 μm or more, from the viewpoint of the mechanical strength of the film required for printing. The thickness is preferably 50 μm or less, more preferably 30 μm or less, which lowers the cost of the film.

As the form of the substrate used in the method for producing a printed material according to the present invention, either a sheet form or a roll form can be used. When printing is performed on a thin film for flexible packaging, it is preferable to use a roll film and perform roll-to-roll printing.

(Ink)

In the method for producing a printed material according to the present invention, as the ink, it is possible to use any of an oxidation polymerization type, a drying type, and an active energy ray curing type, such as flexographic ink, offset ink, gravure ink, screen ink, and inkjet ink, all of which are known. In particular, active energy ray-curable ink having difficulty in leveling due to its instantaneous curing property, particularly offset ink with high viscosity, is preferable because a high smoothing effect can be obtained in an impression process to be described later. Among sorts of the offset ink, ink for waterless lithographic printing may be used. Also, a commercially available product may be used, or a synthetic product may be used.

Specific examples of the commercially available active energy ray-curable ink include EC DEVELOPMENT manufactured by Sun Chemical and XCURA EVO manufactured by Flint Group as electron beam-curable ink.

The synthetic active energy ray-curable ink is obtained by adding a pigment and an auxiliary agent to a resin varnish, in which a resin is dissolved in a polyfunctional (meth) acrylate, and kneading the mixture with a three-roll mill.

Examples of the resin include an acrylic resin, a urethane resin, and a phthalate resin, and a commercially available product may be used, or a synthetic product may be used. Specific examples of the commercially available product include “HIROS” (registered trademark) series manufactured by Seiko PMC Corporation as the acrylic resin, and “DAISO DAP” (registered trademark) series and “DAISO ISO-DAP” (registered trademark) manufactured by OSAKA SODA CO., LTD. as the phthalate resin.

When the resin is synthesized, in the case of an acrylic resin, the acrylic resin can be obtained by performing a polymerization reaction in an organic solvent in the presence of a polymerization initiator by mixing one kind or two or more kinds of (meth)acrylate monomers. It is also possible to copolymerize styrene, α-methyl-styrene, or the like.

As the (meth)acrylate monomer, it is possible to use: isobornyl (meth)acrylate, norbornyl (meth)acrylate, norbornane-2-methanol (meth)acrylate, cyclohexyl (meth)acrylate, tricyclopentenyl (meth)acrylate, tricyclopentenyloxy (meth) acrylate, and tricyclodecane monomethylol (meth)acrylate as a linear or branched alkyl (meth)acrylate with 1 to 24 carbon atoms and an alicyclic alkyl (meth)acrylate; (meth) acrylic acid, itaconic acid, crotonic acid, maleic acid, fumaric acid, vinyl acetate, and the like as a carboxyl group-containing (meth)acrylate; 2-hydroxyethyl acrylate, 2-hydroxybutyl acrylate, and the like as a hydroxyl group-containing (meth)acrylate;

dimethylaminoethyl methacrylate, dimethylaminobutyl methacrylate, and the like as an amino group-containing (meth)acrylate; acrylamide t-butyl sulfonic acid can be used as a sulfo group-containing (meth)acrylate; and 2-methachloroxyethyl acid phosphate as a phosphate group-containing (meth)acrylate.

The urethane resin can be obtained by mixing one or more polyols and one or more polyisocyanates and performing a polycondensation reaction in an organic solvent in the presence of a condensing agent. Examples of the polyol include polyester polyols, polycarbonate polyols, and polyether polyols, and examples of the polyisocyanate include polyurethane polyisocyanates and isocyanurates.

The phthalate resin can be obtained by performing a polymerization reaction in an organic solvent in the presence of a polymerization initiator by mixing diallyl orthophthalate or diallyl isophthalate alone or in combination of two.

Examples of the polyfunctional (meth)acrylate such as: bifunctional (meth)acrylate such as diethylene glycol di(meth)acrylate, triethylene glycol di(meth)acrylate, polyethylene glycol di(meth)acrylate, tripropylene glycol di(meth) acrylate, 1,3-butylene glycol di(meth)acrylate, neopentyl glycol di(meth)acrylate, trimethylolpropane (meth)acrylate, glycerin di(meth)acrylate, pentaerythritol di(meth)acrylate, diglycerin di(meth)acrylate, ditrimethylolpropane (meth) acrylate, dicyclopentadiene tricyclodecane dimethanol di(meth)acrylate, ethylene oxide adducts thereof, propylene oxide adducts thereof, and tetraethylene oxide adducts thereof; trifunctional (meth)acrylate such as trimethylol propane tri(meth)acrylate, pentaerythritol tri(meth)acrylate, ditrimethylolpropane tri(meth)acrylate, glycerin tri(meth)acrylate, isocyanuric acid tri(meth)acrylate, ethylene oxide adducts thereof, and propylene oxide adducts thereof; tetrafunctional (meth)acrylate such as ditrimethylolpropane tetra(meth)acrylate, diglycerin tetra(meth)acrylate, ethylene oxide adducts thereof, and propylene oxide adducts thereof; and pentafunctional (meth)acrylate and higher such as dipentaerythritol hexa (meth)acrylate, ethylene oxide adducts thereof, and propylene oxide adducts thereof.

Examples of the pigment include phthalocyanine-based pigments, soluble azo-based pigments, insoluble azo-based pigments, lake pigments, quinacridone-based pigments, isoindoline-based pigments, threne-based pigments, metal complex-based pigments, titanium oxide, zinc oxide, alumina white, calcium carbonate, barium sulfate, red iron oxide, chrome yellow, zinc yellow, Prussian blue, ultramarine blue, oxide-coated glass powder, oxide-coated mica, oxide-coated metal particles, aluminum powder, gold powder, silver powder, copper powder, zinc powder, stainless steel powder, nickel powder, organic bentonite, iron oxide, carbon black, and graphite.

As the pigment, mica (hydrous aluminum potassium silicate), talc (magnesium silicate salt), and the like, which are colorless extender pigments, can also be used, and anchoring ink containing no color pigment can also be used.

In addition, additives such as a photopolymerization initiator, a wax, a pigment dispersant, an antifoaming agent, and a leveling agent can be used for the ink.

Although an ultraviolet-curable ink containing a photopolymerization initiator can be used, radiation-curable ink not containing a decomposition product or an unreacted product of a photopolymerization initiator is more preferable because these products cause odor or contamination of contents.

The ink used in the present invention preferably has a loss tangent (tan δ) value of 1.0 or more and 4.0 or less at 25° C. and a measurement frequency of 10 rad/s. The value of loss tangent (tan δ, hereinafter simply referred to as “tan δ”) can be measured by sinusoidal vibration test with a dynamic viscoelasticity measuring instrument. Here, tan δ is the ratio of the storage elastic modulus G' to the loss elastic modulus G" (G"/G'). A smaller tan δ value means that the ink has a stronger tendency to return to an original shape against deformation. On the other hand, a larger tan δ value means that the ink has a stronger tendency to undergo deformation. In general, a value less than 1 means that the ink is solid and has low fluidity, and a larger value means that the ink has higher fluidity. By setting tan δ to 1.0 or more, more preferably 2.0 or more under low shear at a measurement frequency of 10 rad/s, the ink can be deformed by impression pressure. By setting the ratio to 4.0 or less, more preferably 3.0 or less, it is possible to prevent the ink from leveling on a non-printing portion and to effectively obtain a smoothing effect by impression pressure.

(Transfer Process)

In the transfer process, the ink is transferred to the transfer target surface of the substrate.

In general, a color printed material requires printing units for transferring ink in the number of colors to be printed. In the printing unit of each color, the ink of a printing portion is transferred from an ink roll to the transfer target surface of the substrate through a printing plate or, depending on the method, a blanket.

In the transfer process, as a method for transferring the ink to the printing target surface, the ink can be transferred to the printing target surface by a known method such as flexographic printing, offset printing, gravure printing, screen printing, inkjet printing, a varnish coater, or a bar coater. In particular, in the offset printing method, the ink generally has high viscosity and a low leveling property, so that the method for producing a printed material according to the present invention can be applied with a remarkable effect. Among offset printing methods, waterless lithographic printing is preferable in which there is no possibility that the smoothing effect deteriorates due to adhesion of dampening water to the impression cylinder having the patterned impression part.

(Impression Process)

In the impression process, the impression cylinder is brought into contact with the transfer target surface to which the ink has been transferred.

In general, an image pattern is different for each color to be printed, a blanket surface corresponding to a place for a non-printing portion of an image in a post-printing unit may come into contact with uncured ink on a transfer target surface transferred by a pre-printing unit. Thereby, a blanket cylinder acts as an impression cylinder, and there is an effect of smoothing the surface of the uncured ink, but the effect is small because the surface of the blanket generally has unevenness. In addition, depending on the number of printing units in a printing machine, there may be an unused vacant printing unit, and a blanket in the vacant printing unit can be utilized as an impression cylinder for ink smoothing. However, the effect is also limited due to the unevenness of the blanket surface. The face leveling roll disclosed in Patent Document 3 has a high effect of further reducing the unevenness of the surface of the printed material by a roll having a rigid and smooth surface. However, in any of these methods, since the entire surface of the printed material is smoothed, not only the solid in which the print density is desired to be improved is smoothed but also the dot gain of the halftone-dot portion increases, thus causing deterioration in gradation expressivity, such as the occurrence of tone jump in shadows and highlights. As the blanket or the roll has a higher smoothing effect for reducing the unevenness, the dot gain further increases because the halftone dots are pressed and leveled in the same principle as the solid.

(Impression Cylinder Having Patterned Impression Part)

In the method for producing a printed material according to the present invention, it is important that at least one of the impression cylinders has a patterned impression part. By the impression cylinder having the patterned impression part in a region that comes into contact with the transfer target surface, it is possible to selectively set a portion to be smoothed and a portion not to be smoothed on the transfer target surface. The smoothing effect is further enhanced when the impression part having smaller unevenness than the blanket surface comes into contact with the uncured ink. In addition, unlike the installation of the roll and the replacement of the blanket disclosed in Patent Literature 3, the patterned impression part can be divided into a place for a solid to be smoothed and a halftone-dot portion not to be smoothed but to maintain gradation expression by selecting whether or not the impression part comes into contact with the transfer target surface by patterning. Furthermore, in the method for producing a printed material according to the present invention, a blanket cylinder existing in the printing machine can be used, equipment modification is not required, and it is only necessary to remove the patterned impression part from the existing blanket cylinder or the blanket surface, and therefore the method is also excellent in convenience.

In the method for producing a printed material according to the present invention, an area of 80% or more of the impression part that comes into contact with the transfer target surface preferably corresponds to a solid transferred to the transfer target surface before the impression process. When the area of 80% or more, more preferably 90% or more, and still more preferably 100%, of the impression part corresponds to the solid, it is possible to effectively achieve both the smoothing effect and the gradation expressivity.

The surface roughness of the upper surface of the impression part is preferably smaller than that of the blanket surface in order to enhance the smoothing effect. A surface roughness Ra calculated by the arithmetic mean of the upper surface of the impression part is preferably 0.30 μm or less from the viewpoint of having a high effect of smoothing the unevenness of the ink surface when the impression part comes into contact with the uncured ink surface. A surface roughness Rz calculated by ten-point average is preferably 2.00 μm or less from the viewpoint of reducing hollow holes on the ink surface due to local unevenness. These parameters of the surface roughness are defined in accordance with JIS B0601: 2013.

The surface free energy of the upper surface of the impression part is preferably 36 mN/m or more and 50 mN/m or less. By setting the pressure to 36 mN/m or more, more preferably 38 mN/m or more, and still more preferably 40 mN/m or more, the impression part receives an excess of the uncured ink that tends to be excessively supplied to the transfer target surface immediately after the start of printing. Therefore, for the subsequent transfer target surfaces, an excessive amount of ink previously received by the impression part can be supplied to the transfer target surface, and the print density is improved. Meanwhile, by setting the pressure to 50 mN/m or less, more preferably 48 mN/m or less, and still more preferably 46 mN/m or less, the ink transferability to the substrate is improved more than that of the impression cylinder having the patterned impression part.

In the method for producing a printed material according to the present invention, the impression cylinder having the patterned impression part is preferably a cylinder to which at least one selected from an offset printing plate, a flexographic printing plate, a resin letterpress, and a blanket is attached. The offset printing plate, the flexographic printing plate, and the resin letterpress (hereinafter, each of these is also referred to as an "original plate of the impression part") are exposed and developed in accordance with the solid of the color to be smoothed in the print image, whereby the solid can be patterned selectively. At this time, when an offset printing plate which is a flat letterpress, a flexographic printing plate which is a letterpress, and a resin letterpress are used as the original plates of the impression part in order to adjust the convex portion of the original plate of the impression part to the solid of the color desired to be smoothed in the print image, the printing portion corresponds to the solid of the print image. On the other hand, when a waterless printing plate that is a flat intaglio plate is used as the original plate of the impression part, the non-printing portion corresponds to the solid of the print image. The original plate of the impression part may be directly attached to the cylinder, or an adhesive layer may be provided on the back surface of the original plate and attached to the blanket attached to the blanket cylinder.

Among those plates, as the original plate of the impression part, it is preferable to use the waterless printing plate that has an outermost surface made of silicone rubber, easily satisfies the surface roughness Ra mentioned above, has high smoothness, and easily repels the ink.

When the blanket is used, it is preferable to paste an ink smoothing material. The ink smoothing material refers to a smooth member having an effect of smoothing the ink by applying impression pressure to the ink. Specifically, a material having the surface roughness Ra described above is preferable. In addition, a material having the surface free energy described above is preferable. The smoothing effect of the blanket alone is small because the surface is uneven, but by pasting the ink smoothing material, the smoothing effect in the impression process can be enhanced. It is also an advantage that the effect of smoothing can be controlled in accordance with the chemical and physical properties of the ink smoothing material to be pasted.

As a method for selectively pasting the ink smoothing material corresponding to the solid of the printed material, in the case of an image in which solid and halftone dots are mixed, an adhesive layer may be provided on the back surface of the ink smoothing material in accordance with only the solid of the color to be smoothed in the printed image, and the ink smoothing material may be attached to the surface of the blanket.

The ink smoothing material may be used by being pasted to the original plate of the patterned impression part. In particular, in the case of an image in which halftone dots such as a background color hardly exist, as a simpler method, the ink smoothing material can be cut into a rough shape covering the solid of the color desired to be smoothed in the printed image and attached to the blanket cylinder or the blanket surface.

The ink smoothing material preferably has an adhesive layer on the back surface thereof (the surface opposite to the side in contact with the printed material). By having the adhesive layer, the ink smoothing material can be easily attached to the blanket cylinder or the blanket surface of the existing printing machine.

The adhesive force of the adhesive layer of the ink smoothing material is preferably 1 N/50 mm or more in which the ink smoothing material is pasted to the surface of the blanket and does not peel off during printing. The adhesive force is preferably 15 N/50 mm or less to which no work load is applied when the ink smoothing material is peeled off from the blanket surface after use. The ink smoothing material having the adhesive layer less likely to remain at the time of peeling from the surface of the blanket is preferable because cleaning becomes simple.

In the method for producing a printed material according to the present invention, the blanket preferably has at least one ink transfer layer, at least one base cloth layer, and at least one compression layer from the viewpoint of ink transferability and durability. An adhesive layer may be provided between the layers to bond adjacent layers.

The material of the ink transfer layer is not particularly limited, and it is possible to appropriately use resins such as a polyimide resin, a polyamideimide resin, a polyamide resin, a polyethylene terephthalate resin, a polyethylene naphthalate resin, a polycarbonate resin, an acrylonitrile-butadiene-styrene (ABS) resin, a poly (meth)acrylic acid methyl resin, a polyvinylidene fluoride resin, a polyvinyl chloride resin, a polyvinylidene chloride resin, a polyvinyl alcohol resin, a polyethylene resin, a polypropylene resin and a polyurethane resin, and rubbers such as an ethylene-propylene rubber (EPM), an ethylene-propylene-diene rubber (EPDM), an acrylonitrile butadiene rubber (NBR), a carboxylated acrylonitrile butadiene rubber (XNBR), an acrylic rubber (ACM), a chloroprene rubber (CR), an epoxidized natural rubber (ENR), a hydrogenated acrylonitrile butadiene rubber (HNBR), and a urethane rubber.

In order to attach the blanket to the blanket cylinder, the adhesive layer may be provided on the surface opposite to the ink transfer layer. The material of the adhesive layer is not particularly limited, but a thermoplastic resin, a thermosetting resin, a synthetic rubber, and a natural rubber can be used appropriately. Polyurethanes, acrylic resins, polysulfides, polyvinyl chloride, modified polyolefins, polyureas, butadiene rubbers, styrene-butadiene rubbers, chloroprene rubbers, and silicone rubbers are preferably used from the viewpoint of improving adhesion to the adjacent layer and the blanket cylinder.

Compressive stress at an indentation amount of the blanket cylinder of 0.30 mm is preferably 200 N/cm$^2$ or more and 600 N/cm$^2$ or less. By setting the stress to 200 N/cm$^2$ or more, more preferably 250 N/cm$^2$ or more, still more preferably 300 N/cm$^2$ or more, the ink transferability from the blanket cylinder to the film is improved. By setting the stress to 600 N/cm$^2$ or less, more preferably 550 N/cm$^2$ or less, and still more preferably 500 N/cm$^2$ or less, the load on the printing machine can be reduced.

From the viewpoint of the compressibility of the blanket, the indentation amount between the blanket cylinder and the film is preferably 0.20 mm or more and 0.40 mm or less, more preferably 0.25 mm or more and 0.38 mm or less, still more preferably 0.30 mm or more and 0.36 mm or less.

The thickness of the impression part depends on the making of the cylinder in the printing machine, but the thickness after the attachment is preferably 1 mm or more and 3 mm or less, which is about the same as that of the existing blanket, so that the printing pressure can be adjusted in a normal range after the attachment.

In the method for producing a printed material according to the present invention, preferably, there is a single impression drum that faces a cylinder for transferring ink and an impression cylinder and sandwiches the substrate with the cylinder and the impression cylinder. By using the single impression drum, multi-color printing can be performed with high aim accuracy even when the substrate is a thin film, and the deviation between the solid of the printing target surface and the patterned impression part is reduced. As a specific mechanism, it is preferable to use a rotary printing machine including a center impression cylinder. Specific examples of the rotary printing machine include "MIRAFLEX" manufactured by Windmoeller & Hoelscher as a flexographic printing machine, and CI-8 manufactured by Comexi Group as an offset printing machine.

In the impression process, the impression pressure between the impression cylinder and the impression drum that applies pressure to the substrate together with the impression cylinder is preferably 100 N/cm$^2$ or more, more preferably 200 N/cm$^2$ or more, still more preferably 300 N/cm$^2$ or more, which has a high effect of smoothing unevenness on the ink surface. The impression pressure is preferably 700 N/cm$^2$ or less, more preferably 600 N/cm$^2$, and still more preferably 500 N/cm$^2$ or less, at which an excessive load is not applied to the printing machine including the impression drum and the impression cylinder.

In the method for producing a printed material according to the present invention, the transfer process is performed a plurality of times, at least one of the plurality of times is a process of transferring the ink including a solid, and the impression process may be included after the transfer process. The smoothing effect can be effectively obtained by applying impression pressure with the impression part corresponding to the solid.

In particular, it is preferable that at least a first transfer process among the plurality of times of transfer processes be a process of transferring the ink including a solid, and the impression process be included after the transfer process. In the production of the printed material, ink of a color widely including a solid or a functional ink such as anchoring ink is transferred first, and the ink is subjected to the impression process at an appropriate timing, so that it is possible to effectively obtain the smoothing effect of the solid while avoiding crushing the halftone-dot portion of the ink including many halftone-dot portions.

In the method for producing a printed material according to the present invention, the ink to be transferred including a solid is preferably at least one of white ink and the anchoring ink. This is because, although there is no limitation on the use of any color ink, both the white ink and the anchoring ink have very little representation by halftone dots and are mostly solids. The white ink is generally a background color having a high concealing property and is preferably applied as a surface printing by transferring the white ink including a solid in at least the first transfer process among the plurality of times of transfer processes. The anchoring ink is preferably used in at least the first transfer process among the plurality of times of transfer processes because the anchoring ink corresponds to an intermediate layer that is in close contact with both a film as the substrate and another ink.

The method for producing a printed material according to the present invention may further include another transfer process between the impression process and the irradiation process. This method is effective when the solid and the halftone-dot portion overlap in the print image. That is, after the reduction in the unevenness of the solid of the pre-printing ink by the impression cylinder having the patterned impression part, the halftone-dot portion of the post-printing ink overlaps the solid place of the pre-printing ink, whereby the smoothness of the solid and the gradation expressivity of the halftone-dot portion can be achieved even at the same place. This is different from the process of smoothing the entire surface of the printed material with the face leveling roll only after the printing with all colors as disclosed in Patent Document 3, and the unit of the impression cylinder having the patterned impression part can be selected, thus enabling selective smoothing of an arbitrary place of an arbitrary color. In addition, when the smoothness of the color of the pre-printing is improved, the transferability of the color of the post-printing overlapping at the same place is also improved, which is preferable.

The method for producing a printed material according to the present invention preferably includes another transfer process after the impression process, and another impression process after the transfer process. By performing the impression process a plurality of times, the smoothing effect can be further enhanced. In another impression process as well, it is possible to perform smoothing with high accuracy and a high degree of freedom by impression pressure with the selective placement of the impression cylinder having the patterned impression part corresponding to the ink pattern of the transfer process immediately before another impression process. The number of times that the impression process is performed is not particularly limited, but even when existing equipment is used, the impression process can be practically performed up to the number of times of difference between the number of printing units of the printing machine and the number of printing colors of the image.

(Irradiation Process)

In the irradiation process, the transferred ink is irradiated with an active energy ray.

In the method for producing a printed material according to the present invention, examples of the active energy ray source include ultraviolet rays (particularly, LED-UV), electron beams, gamma rays, and the like. Radiation, such as an electron beam and a gamma ray, generates high-energy secondary electrons in an irradiation substance, excites surrounding molecules, and generates reactive active species represented by radicals. When the substance to be irradiated is active energy ray-curable ink, radicals are generated in the ink, and radical polymerization proceeds to form a cured/ink film. In particular, an electron beam at a low acceleration voltage is preferably used because the electron beam has sufficient permeability with respect to a thickness of an ink film of 10 μm or less, is given energy necessary for curing, does not require special qualification at the time of use, and is easy to handle.

Since the transmission depth of the electron beam is determined by an acceleration voltage, the acceleration voltage of the electron beam is preferably 50 kV or more, more preferably 90 kV or more, still more preferably 110 kV or more, which allows a sufficient dose of the electron beam to pass through the ink film. When the transmission depth increases, the dose given to the inside of the film also increases, and hence the transmission depth is preferably 300 kV or less, more preferably 200 kV or less, and still more preferably 150 kV or less.

As the irradiation dose of the electron beam is higher, the amount of radical species generated in the target substance increases, but the damage of the film also increases, and hence the irradiation dose is preferably 10 kGy or more and 100 kGy or less, and more preferably 20 kGy or more and 50 kGy or less.

(Printed Material)

The printed material of the present invention is characterized in that the surface roughness Ra of the solid on the printed material is 0.10 μm or more and 0.50 μm or less, and a Young's modulus of an arbitrary ink film on the printed material is 3 GPa or more and 5 GPa or less. In general, the printed material using active energy ray-curable ink has a poor leveling property due to instantaneous curing and has a surface roughness Ra of a solid of 1 μm or more. However, the surface unevenness of the ink is reduced by the impression process, so that smoothness comparable to that of existing gravure printing is obtained. By setting the surface roughness Ra of the solid on the printed material to 0.10 μm or more and 0.50 μm or less, the glossiness required particularly for a surface-printing printed material is excellent.

In general, active energy ray-curable ink is cured by crosslinking a polyfunctional (meth)acrylate by radical polymerization upon irradiation with an active energy ray to form a network structure, so that an ink film is hardened as compared with solvent-drying gravure ink or flexographic ink, and therefore the active energy ray-curable ink is also excellent in mechanical properties such as abrasion resistance and scratch resistance particularly required for a surface-printing printed material. This preferable because, in particular, the resin in the ink has a large number of ethylenically unsaturated groups to facilitate the progress of three-dimensional crosslinking. With the Young's modulus being in the range of 3 GPa or more and 5 GPa or less, the ink satisfies mechanical strengths such as abrasion resistance and scratch resistance necessary for surface printing and can follow the bending of a printed material to some extent.

EXAMPLES

Hereinafter, the present invention will be specifically described with reference to Examples. However, the present invention is not limited thereto.

<Preparation of Ink>

[Black Ink 1]

A mixture composed of 30 parts by mass of DAISO DAP (registered trademark) K manufactured by OSAKA SODA CO., LTD. as a diallyl phthalate resin, 25 parts by mass of M600 manufactured by Miwon Specialty Chemical Co., Ltd and 23 parts by mass of M3130 manufactured by Miwon Specialty Chemical Co., Ltd as polyfunctional (meth)acrylates, 18 parts by mass of MogulE manufactured by Cabot Corporation as a black pigment, 2 parts by mass of Micro Ace P-8 manufactured by Nippon Talc Co., Ltd. as extender pigment, 1 part by mass of Disper BYK2013 manufactured by BYK Additives & Instruments as a dispersant, and 1 part by mass of KTL-4N manufactured by KITAMURA LIMITED as wax was kneaded with a three-roll mill to prepare active energy ray-curable Black ink 1. Black ink 1 had a tan δ of 2.8 at 25° C. and a measurement frequency of 10 rad/s.

[Black Ink 2]

A mixture composed of 28 parts by mass of DAISO DAP (registered trademark) K manufactured by OSAKA SODA CO., LTD. as a diallyl phthalate resin, 22 parts by mass of M600 manufactured by Miwon Specialty Chemical Co., Ltd and 32 parts by mass of M3130 manufactured by Miwon Specialty Chemical Co., Ltd as polyfunctional (meth)acrylates, 16 parts by mass of MogulE manufactured by Cabot Corporation as a black pigment, 1 part by mass of Disper BYK2013 manufactured by BYK Additives & Instruments as a dispersant, and 1 part by mass of KTL-4N manufactured by KITAMURA LIMITED as wax was kneaded with a three-roll mill to prepare active energy ray-curable Black ink 2. Black ink 2 had a tan δ of 4.6 at 25° C. and a measurement frequency of 10 rad/s.

[White Ink 1]

A mixture composed of 16 parts by mass of HIROS (registered trademark) VS-1259 manufactured by Seiko PMC Corporation as an acrylic resin, 18 parts by mass of M4004 manufactured by Miwon Specialty Chemical Co., Ltd and 17 parts by mass of M262 manufactured by Miwon Specialty Chemical Co., Ltd as polyfunctional (meth)acrylates, 45 parts by mass of CR58-2 manufactured by ISHIHARA SANGYO KAISHA, LTD. as a white pigment, 2 parts by mass of Micro Ace P-8 manufactured by Nippon Talc Co., Ltd. as extender pigment, 1 part by mass of Disper BYK111 manufactured by BYK Additives & Instruments as a dispersant, and 1 part by mass of KTL-4N manufactured by KITAMURA LIMITED as wax was kneaded with a three-roll mill to prepare active energy ray-curable White ink 1. White ink 1 had a tan δ of 3.8 at 25° C. and a measurement frequency of 10 rad/s.

<Method for Measuring Tan δ>

The tan δ of each ink was measured using a rheometer (MCR301, manufactured by Anton Paar) under conditions of 25° C., an ink amount of 0.1 ml, a parallel plate diameter of 25 mm, a strain of 5%, and a measurement frequency of 10 rad/s.

<Blanket Material>

Blanket material 1: T414W (manufactured by KINYOSHA CO., LTD., thickness: 1.95 mm, compressive stress at 0.30 mm indentation: 400 N/cm$^2$, surface roughness Ra: 1.02 μm, Rz: 8.24 μm)

Blanket material 2: FIT-UV (manufactured by FUJIKURA COMPOSITES Inc., thickness: 1.95 mm, compressive stress at 0.30 mm indentation: 270 N/cm$^2$, surface roughness Ra: 1.05 μm, Rz: 6.43 μm)

Blanket material 3: EX6300W (manufactured by KINYOSHA CO., LTD., thickness: 1.95 mm, compressive stress at 0.30 mm indentation: 164 N/cm$^2$, surface roughness Ra: 0.54 μm, Rz: 3.79 μm)

Blanket material 4: T626 (manufactured by KINYOSHA CO., LTD., thickness: 1.70 mm, compressive stress at 0.30 mm indentation: 629 N/cm$^2$, surface roughness Ra: 0.96 μm, Rz: 9.80 μm).

<Compressive Stress>

The compressive stress at the time of indentation of each blanket material was measured by the following method. A blanket material of 30 mm×30 mm square was prepared and pasted to a compression board of a universal material testing machine (AG-50kNXplus, manufactured by Shimadzu Corporation). As measurement terminals, a compression pressure receiving plate (upper) (dimension: diameter 50 mm) and a compression board (lower) (dimension: diameter 200 mm) were used. The measurement was performed with the compression board (lower) fixed. A load was applied to the blanket material until the pushing speed reached 1 mm/min and the maximum load reached 13.5 kN (assumed maximum stress: 15 MPa). The moving distance of the compression pressure receiving plate (upper) was measured and taken as the indentation amount. The measured load value at an indentation amount of 0.30 mm was converted into a unit of pressure divided by the area of the blanket material. The above measurement was repeated three times, and the average value thereof was calculated.

<Member of Impression Part>

[Member 1 of Impression Part]

As an adhesive layer, UTD-10B (manufactured by NITTO DENKO CORPORATION, thickness: 10 μm, adhesive force: 5.8 N/50 mm) was pasted to the back surface of "LUMIRROR" (registered trademark) S10 (manufactured by Toray Industries, Inc., Inc., thickness: 50 μm, surface roughness Ra: 0.06 μm, Rz: 0.47 μm, surface free energy: 44 mN/m). This ink smoothing material was used as Member 1 of the impression part.

[Member 2 of Impression Part]

SP-PET-O3-BU (manufactured by Mitsui Chemicals Tohcello Inc., thickness: 75 μm, surface roughness Ra: 0.05 μm, Rz: 0.26 μm, surface free energy: 30 mN/m, adhesive force: 0.6 N/50 mm) was used as an ink smoothing material. This ink smoothing material was used as Member 2 for impression pressure.

[Member 3 of Impression Part]

Circuit tape 647 (manufactured by TERAOKA SEISAKUSHO CO., LTD., thickness 80 μm, surface roughness Ra: 0.12 μm, Rz: 0.40 μm, surface free energy 36 mN/m, adhesive force 15 N/50 mm) was used as an ink smoothing material. This ink smoothing material was used as Member 3 of the impression part.

[Member 4 of Impression Part]

An adhesive layer UTD-10B (manufactured by NITTO DENKO CORPORATION, thickness: 10 μm, adhesive force: 5.8 N/50 mm) was pasted to the back surface of "LUMIRROR" (registered trademark) X42 (manufactured by Toray Industries, Inc., thickness: 50 μm, surface roughness Ra: 0.32 μm, Rz: 2.50 μm, surface free energy: 42 mN/m) to obtain an ink smoothing material. This ink smoothing material was used as Member 4 of the impression part.

[Member 5 of Impression Part]

An adhesive layer, UTD-30B (manufactured by NITTO DENKO CORPORATION, thickness: 30 μm, adhesive force: 22 N/50 mm) was applied as to the back surface of "EVAL" (registered trademark) EF-F (manufactured by KURARAY CO., LTD., thickness: 50 μm, surface roughness Ra: 0.10 μm, Rz: 0.37 μm, surface free energy: 54 mN/m) to obtain an ink smoothing material. This ink smoothing material was used as Member 5 of the impression part.

[Member 6 of Impression Part]

A waterless lithographic printing original plate (TAC-VT4 manufactured by Toray Industries, Inc., thickness: 240 μm) is subjected to exposure and development such that a place to be an impression part remained as a convex portion, thereby preparing a plate. To the back surface of the obtained plate, UTD-10B (manufactured by NITTO DENKO CORPORATION, thickness: 10 μm, adhesive force: 5.8 N/50 mm) was bonded as an adhesive layer to obtain Member 6 of the impression part.

[Member 7 of Impression Part]

A resin letterpress ("Torelief" K-type manufactured by Toray Industries, Inc.) was subjected to exposure and development such that a predetermined place as an impression part remained as a convex portion, thereby preparing a plate. To the back surface of the obtained plate, UTD-10B (manufactured by NITTO DENKO CORPORATION, thickness: 10 μm, adhesive force: 5.8 N/50 mm) was bonded as an adhesive layer to obtain Member 7 of the impression part.

<Surface Roughness>

The surface roughness of the member of each impression part was measured in accordance with JIS B0601-2013. Using (VK-X210 manufactured by KEYENCE CORPORATION) as a laser microscope, measurement was performed at ten points randomly selected under conditions of a magnification of 20 times and a resolution of 0.1 μm, and an average value was taken.

<Surface Free Energy>

For the surface free energy of the member of each impression part, a contact angle was measured with each solvent of water, ethylene glycol, and glycerin by a droplet method using an automatic contact angle meter (Drop Master DM-500, manufactured by Kyowa Interface Science Co., Ltd), and the surface free energy of the ink was calculated from the extended Fowkes equation.

<Adhesive Force>

The adhesive force of each ink smoothing material was measured by peeling off a sample having a width of 50 mm pasted to a stainless substrate at 180° at 300 mm/min by using a Tensilon universal tester (RTG-1210 manufactured by Orientec Co., Ltd.).

<Preparation of Printing Plate>

Figure 2:
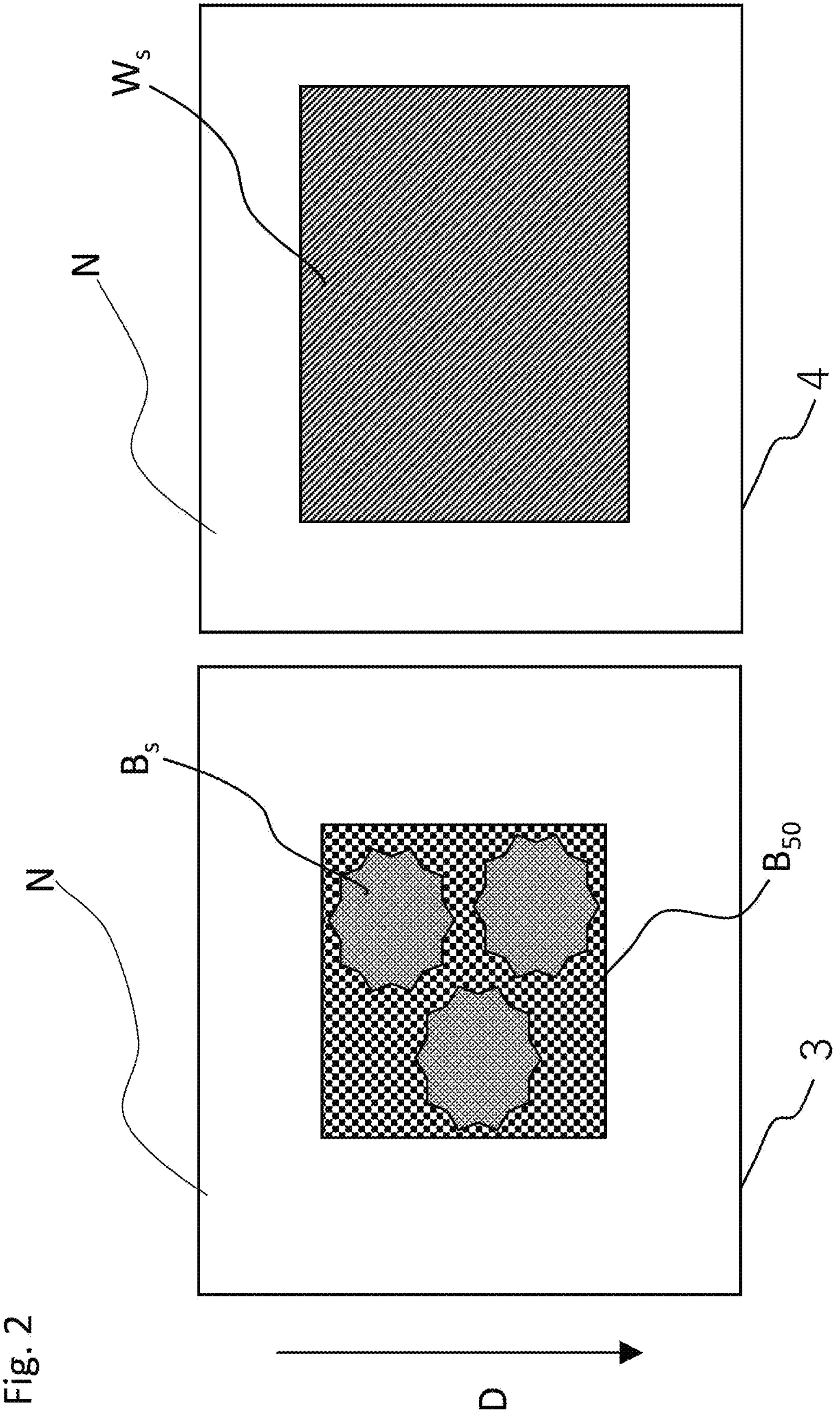
FIG. 2 is a view showing images of printing plates used in Printing methods 4, 5, and 6 in Examples.

From a waterless lithographic printing original plate (TAC-VT4 manufactured by Toray Industries, Inc.), waterless printing plates corresponding to Images 1, 2 in FIG. 1 and Images 3, 4 in FIG. 2 were prepared, respectively. Image 1 in FIG. 1 has a black solid and a 50% halftone-dot portion. Image 2 in FIG. 1 has an image of only a white solid. Image 3 in FIG. 2 has a black solid and 50% halftone dots. Image 4 in FIG. 2 has an image of only a white solid.

<Preparation of Impression Cylinder>

The member of the impression part was attached to each of Blanket materials 1 to 4 having different compression characteristics as a base, and a total of 14 types of impression cylinders including 13 types of impression cylinders in which the impression part was patterned and one type of impression cylinder in which the impression part was not patterned were prepared. Regarding the patterning of the impression part, Table 1 shows the correspondence with the impression cylinder as follows.

[Pattern 1]

The impression part was performed so as to come into contact only with a place corresponding to the solid of Black image 1 in FIG. 1. The ratio of the area of the impression part corresponding to the solid (hereinafter, also referred to as "solid area ratio") is 100%.

[Pattern 2]

The impression part was performed so as to come into contact only with a place corresponding to the solid of Black image 3 in FIG. 2. The solid area ratio of the impression part is 100%.

[Pattern 3]

Figure 3:
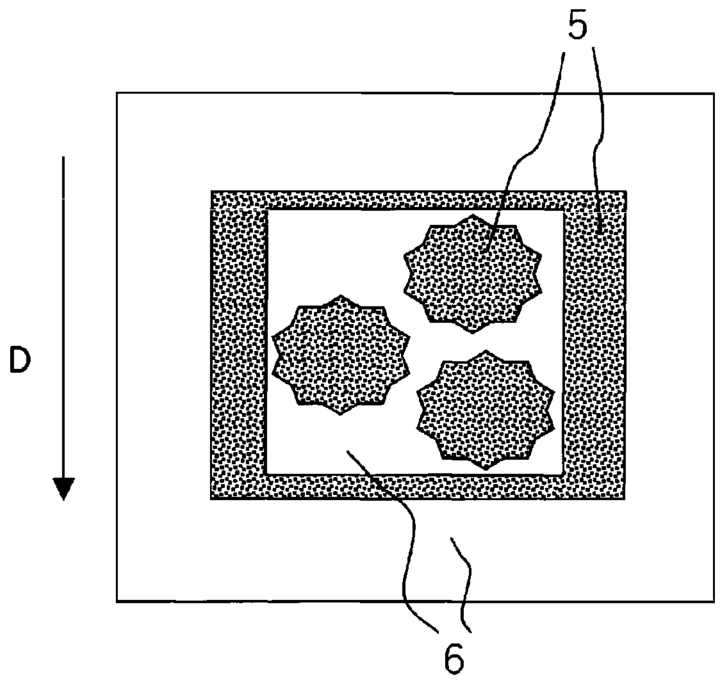
FIG. 3 is a view showing an aspect in which a smoothing material is selectively pasted corresponding to the image of FIG. 2.
Figure 4:
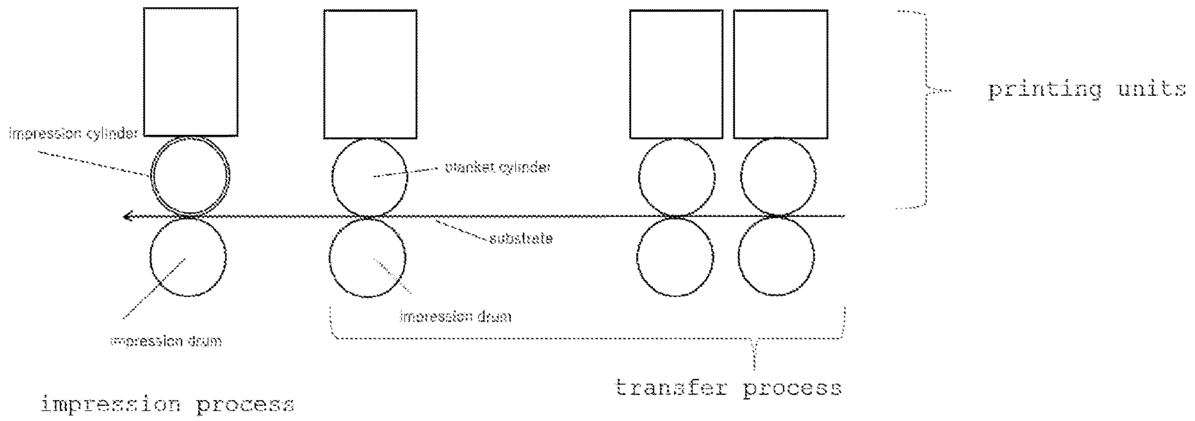
FIG. 4 is a depiction of a conventional printing device that includes plural impression drums.
Figure 5:
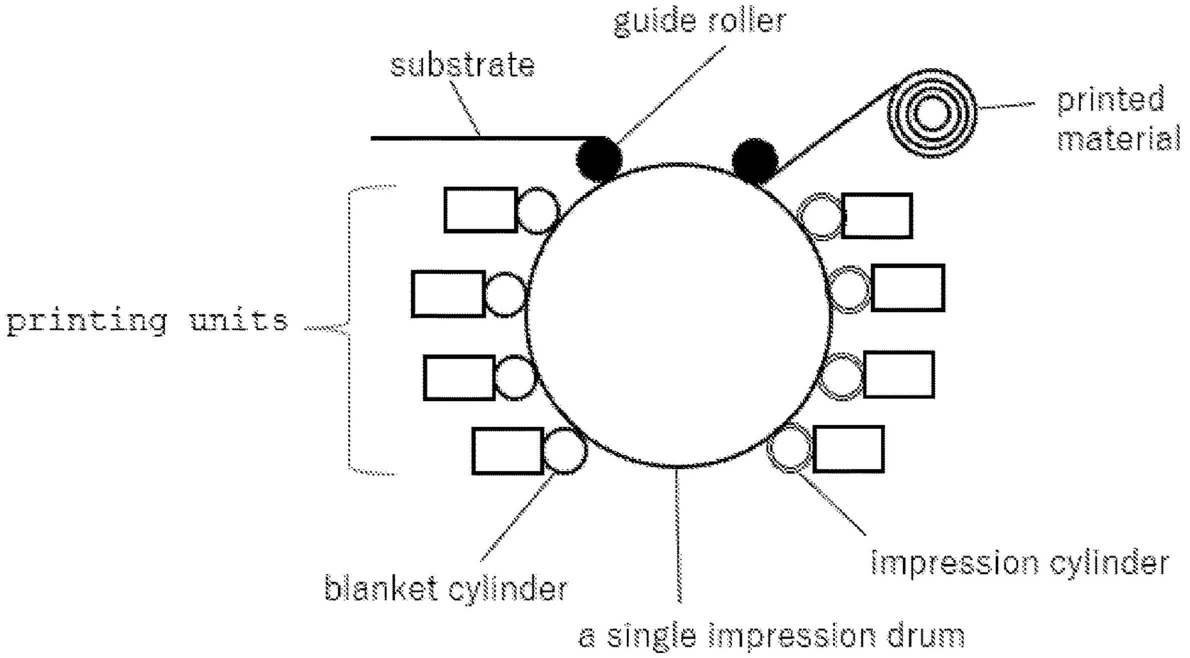
FIG. 5 is a depiction of a conventional printing device that includes a single impression drum.

The impression part was patterned so as to come into contact with a place except for the halftone-dot portion of Black image 3 in FIG. 2 and only a place corresponding to the solid of White image 4 in FIG. 2 (FIG. 3). The solid area ratio of the impression part is 100%.

[Pattern 4]

The impression part was performed so as to come into contact only with a place corresponding to the solid of White image 4 in FIG. 2. The solid area ratio of the impression part is 100%.

[Pattern 5]

Patterning to set the impression part at a specific position was not performed, and the impression part was brought into contact with the entire surface of the substrate. The solid area ratio of the impression part is 78% with respect to Black image 1 in FIG. 1 and 13% with respect to Black image 3 in FIG. 2.

TABLE 1

| | Impression cylinder | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| Blanket material | 1 | 2 | 3 | 4 | 1 | 1 | 1 | 1 | 4 | 4 | 4 | 4 | 1 | 1 |
| Member of impression part | 1 | 1 | 1 | 1 | 2 | 3 | 4 | 5 | 6 | 7 | 6 | 6 | 1 | N/A |
| Pattern | 1 | 1 | 1 | 1 | 1 | 1 | 1 | 1 | 2 | 2 | 3 | 4 | 5 | N/A |
| Surface roughness Ra (μm) | 0.06 | 0.06 | 0.06 | 0.06 | 0.05 | 0.12 | 0.32 | 0.10 | 0.04 | 0.07 | 0.04 | 0.04 | 0.06 | 0.96 |
| Surface roughness Rz (μm) | 0.47 | 0.47 | 0.47 | 0.47 | 0.26 | 0.4 | 2.5 | 0.37 | 0.31 | 0.59 | 0.31 | 0.31 | 0.47 | 9.80 |
| Surface free energy of impression part (mN/m) | 44 | 44 | 44 | 44 | 30 | 36 | 42 | 54 | 24 | 49 | 24 | 24 | 44 | — |

TABLE 1-continued

| | Impression cylinder | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| Adhesive force of adhesive layer (N/50 mm) | 5.8 | 5.8 | 5.8 | 5.8 | 0.6 | 15 | 5.8 | 22 | 5.8 | 5.8 | 5.8 | 5.8 | 5.8 | — |
| Compressive stress ($N/cm^2$) | 400 | 270 | 164 | 629 | 400 | 400 | 400 | 400 | 629 | 629 | 629 | 629 | 400 | 400 |

Note that the surface roughnesses Ra, Rz and the surface free energy in Table 1 show the surface roughnesses and the surface free energy of the impression part for each of the impression cylinders, and the surface roughnesses of the blanket material for Impression cylinder 14 not provided with the member of the impression part.

<Print Test>

A configuration common to Printing methods 1 to 7 below will be described. CI-8 manufactured by Comexi Group was used as a flexible packaging lithographic printing machine capable of installing up to 7 blanket cylinders. In Printing methods 1 to 7 below, the installation positions of the seven blanket cylinders are referred to as a first cylinder, a second cylinder, a third cylinder, a fourth cylinder, a fifth cylinder, a sixth cylinder, and a seventh cylinder in order from the upstream side in a direction in which a film to be printed runs. Regarding the installation position of a blanket cylinder not mentioned in each printing method, although no impression throw-in is performed, color printing is possible by installing transfer processes for cyan, magenta, and, yellow ink at unmentioned installation positions.

In the transfer process (first and fourth cylinders in Printing methods 1, 2, 4, 5, and 7, below and first and sixth cylinders in Printing methods 3 and 6 below), Blanket material 1 was attached to the prepared waterless printing plate and the blanket cylinder, and active energy ray-curable ink for waterless printing was transferred to a PET film (manufactured by Polyplex Corporation Ltd, S-46, thickness: 12 μm) at a printing speed of 150 m/min.

In the irradiation process, the ink was cured by electron beam irradiation at an acceleration voltage of 110 kV and an irradiation dose of 30 kGy to obtain a printed material. 3000 m printing was performed for each level.

[Printing Method 1]

In Printing method 1, in the first cylinder, Black ink 1 was set on an ink roller, and the waterless printing plate having a pattern corresponding to Black image 1 in FIG. 1 was set on the plate cylinder. In the fourth cylinder, White ink 1 was set on an ink roller, and the waterless printing plate having a pattern corresponding to White image 2 in FIG. 1 was set on a plate cylinder. Impression throw-in was performed on the first and fourth cylinders to adjust the ink supply amount such that a reflection densitometer (SpectroEye manufactured by GretagMacbeth) indicates 1.4 for the black solid, and printing was performed

[Printing Method 2]

In Printing method 2, in the first cylinder, Black ink 1 was set, and the waterless printing plate having a pattern corresponding to Black image 1 in FIG. 1 was set on the plate cylinder. In the fourth cylinder, White ink 1 was set on the ink roller, and the waterless printing plate having a pattern corresponding to White image 2 in FIG. 1 was set on the plate cylinder. In addition, an impression cylinder was set on the sixth cylinder. The ink supply amount was set to be the same as that in Printing method 1, impression throw-in was performed on the first, fourth, and sixth cylinders, and printing was performed

[Printing Method 3]

In Printing method 3, in the first cylinder, White ink 1 was set on the ink roller, and the waterless printing plate having a pattern corresponding to White image 2 in FIG. 1 was set on the plate cylinder. In the sixth cylinder, Black ink 1 was set on the ink roller, and the waterless printing plate having a pattern corresponding to Black image 1 in FIG. 1 was set on the plate cylinder. In addition, an impression cylinder was set on the seventh cylinder. The ink supply amount was set to be the same as in Printing method 1, and the impression throw-in was performed on the first, sixth, and seventh cylinders, and printing was performed.

[Printing Method 4]

In Printing method 4, in the first cylinder, Black ink 1 was set on the ink roller, and the waterless printing plate having a pattern corresponding to Black image 3 in FIG. 2 was set on the plate cylinder. In the fourth cylinder, White ink 1 was set on the ink roller, and the waterless printing plate having a pattern corresponding to White image 4 in FIG. 2 was set on the plate cylinder. Impression throw-in was performed on the first and fourth cylinders to adjust the ink supply amount such that a reflection densitometer (SpectroEye manufactured by GretagMacbeth) indicates 1.4 for the black solid, and printing was performed

[Printing Method 5]

In Printing method 5, in the first cylinder, Black ink 1 was set on the ink roller, and the waterless printing plate having a pattern corresponding to Black image 3 in FIG. 2 was set on the plate cylinder. In the fourth cylinder, White ink 1 was set on the ink roller, and the waterless printing plate having a pattern corresponding to White image 4 in FIG. 2 was set on the plate cylinder. In addition, an impression cylinder was set on the third cylinder. The ink supply amount was set to be the same as that in Printing method 4, impression throw-in was performed on the first, third, and fourth cylinders, and printing was performed

[Printing Method 6]

In Printing method 6, in the first cylinder, White ink 1 was set on the ink roller, and the waterless printing plate having a pattern corresponding to White image 4 in FIG. 2 was set on the plate cylinder. In the sixth cylinder, Black ink 1 was set on the ink roller, and the waterless printing plate having a pattern corresponding to Black image 3 in FIG. 2 was set on the plate cylinder. In addition, an impression cylinder was set on each of the third cylinder and the seventh cylinder. The ink supply amount was set to be the same as that in Printing method 4, impression throw-in was performed on the first, third, sixth, and seventh cylinders, and printing was performed

[Printing Method 7]

In Printing method 7, in the first cylinder, Black ink 2 was set on the ink roller, and the waterless printing plate having a pattern corresponding to Black image 3 in FIG. 2 was set on the plate cylinder. In the fourth cylinder, White ink 1 was set on the ink roller, and the waterless printing plate having a pattern corresponding to White image 4 in FIG. 2 was set on the plate cylinder. In addition, an impression cylinder was set on the third cylinder. The ink supply amount was set to be the same as that in Printing method 4, impression throw-in was performed on the first, third, and fourth cylinders, and printing was performed The impression pressure between the blanket cylinder and the impression drum that applies pressure to the film together with the blanket cylinder was measured by inserting a pressure-sensitive sheet (Prescale LW manufactured by FUJIFILM Corporation) between the cylinder and the drum and performing impression throw-in in a stopped state.

<Measurement of Black Print Density>

For the black solid of the printed material, the print density of the black was measured using the reflection densitometer (SpectroEye from GretagMacbeth). The measurement was performed on the printed materials prepared by Printing methods 1, 2, 4, and 5 from the film surface because these were bottom-printing printed materials, and the measurement was performed on the printed materials prepared by Printing methods 3 and 6 from the ink surface because these were surface-printing printed materials.

<Dot Gain Measurement>

For the 50% halftone-dot portion of the printed material, a dot gain value was measured using the reflection densitometer (SpectroEye from GretagMacbeth). The measurement was performed on the printed materials prepared by Printing methods 1, 2, 4, and 5 from the film surface because these were bottom-printing printed materials, and the measurement was performed on the printed materials prepared by Printing methods 3 and 6 from the ink surface because these were surface-printing printed materials. When the dot gain value is within a range of 14±4%, halftone reproducibility is good, and as the dot gain value deviates more from 14% of the center, gradation expressivity decreases due to the thickening or thinning of the halftone dots.

<Peeling of Member of Impression Part>

Evaluations were made on the occurrence or non-occurrence of peeling of the member of the impression part during printing and the ease of peeling of the member of the impression part from the blanket after printing, according to the following criteria.

○: There was no peeling during printing, and it was easy to peel off the member of the impression part from the blanket after printing.

Δ: There was no peeling during printing, but it was difficult to peel off the member of the impression part from the blanket after printing, and the adhesive layer remained.

x: The member of the impression part peeled off during printing.

<Measurement of Surface Roughness of Solid of Printed Material>

For the surface-printing printed materials manufactured by Printing methods 3 and 6, the color of the ink was not distinguished, and ten measurement points were randomly extracted with only the solid as a measurement target, and the surface roughness was measured under conditions of a magnification of 20 times and a resolution of 0.1 μm using (VK-X210 manufactured by KEYENCE CORPORATION) as a laser microscope.

<Gloss Value of Solid of Printed Material>

For the surface-printing printed materials manufactured by Printing methods 3 and 6, the color of the ink was not distinguished, and ten measurement points were randomly extracted with only a solid as a measurement target, and the gloss value was measured at a measurement angle of 60 degrees using a precision gloss meter GM-26D (manufactured by MURAKAMI COLOR RESEARCH LABORATORY CO., LTD.). A gloss value of 35 or less is poor, a gloss value of 45 or more is good, and a gloss value of 55 or more is extremely good.

<Measurement of Young's Modulus of Ink-Cured Film>

For the surface-printing printed materials manufactured by Printing methods 3 and 6, a load-indentation depth diagram was obtained for an arbitrary solid in the printed material by a nanoindentation method (continuous stiffness measurement method) using an ultra-microhardness tester (Nano Indenter XP, manufactured by MTS Systems Corporation). Then, assuming that the Poisson's ratio of a sample was 0.4, the Young's modulus at an indentation depth of 0.1 μm was calculated.

<Scratch Resistance of Printed Material>

For the surface-printing printed materials manufactured by Printing methods 3 and 6, an arbitrary solid was rubbed back and forth 20 times with a nail of an evaluator, and the degree of scratch was evaluated.

○: No scratch due to the nail was observed.

x: The ink completely peeled off along the nail mark, and the film was exposed.

Example 1 and Comparative Examples 1 and 2

The blanket material, the member of the impression part or the presence or absence thereof, and Impression cylinders 1, 13, 14 according to the combination of the patterns of the impression part shown in Table 1 were used for the impression process of the sixth cylinder in Example 1 and Comparative Examples 1 and 2 in the corresponding order, and printing was performed by Printing method 2. In Example 1 and Comparative Example 1 in which the impression part came into contact with the solid of the black image, an improvement in the print density of the black was observed, and the print density improvement effect was greater than that by the impression pressure applied by the impression cylinder of only the blanket material in Comparative Example 2. Comparing Example 1 in which the solid area ratio with respect to the black image was 100% with Comparative Example 1 in which the solid area ratio with respect to the black image was 78%, in Example 1, the black halftone dots were not thickened, and the dot gain could be suppressed to be small. In Example 1 in which the impression part was patterned so as to selectively come into contact only with the black solid, the thickening of the halftone dots was suppressed, and the print density improvement effect only on the selective black solid was observed. Tables 2 and 3 show the results.

Comparative Example 3

Printing was performed by Printing method 1 in which impression throw-in was not performed on the sixth cylinder for the impression process in Printing method 2 (Example 1). Compared to Example 1, since impression throw-in for the impression process was not performed, there was no smoothing effect on the printed material. Table 3 shows the results.

Examples 2 to 4

The blanket material, the member of the impression part, and the impression cylinders 2 to 4 according to the combination of the patterns of the impression part shown in Table 1 were used for the impression process of the sixth cylinder in Examples 2 to 4 in the corresponding order, and printing was performed by Printing method 2. That is, the process was similar to that of Example 1 except that the blanket material was changed. With all the impression parts being selectively patterned only for the black solid, in any of the examples, the thickening of halftone dots was suppressed, and the print density improvement effect only on the selective black solid was observed. Further, the print density tended to increase as the repulsion of the compression characteristics of the blanket increased. On the other hand, although the impression part is not patterned so as to come into contact with the black halftone-dot portion, the dot gain tended to increase because the blanket with higher compressibility comes into contact with the dot portion more strongly. Table 2 shows the results.

Examples 5 to 8

The blanket material, the member of the impression part, and the impression cylinders 5 to 8 according to the combination of the patterns of the impression part shown in Table 1 were used for the impression process of the sixth cylinder in Examples 5 to 8 in the corresponding order, and printing was performed by Printing method 2. That is, Examples 5 to 8 are similar to Example 1 except that the type of the member of the impression part is changed. With all the impression parts being patterned so as to selectively come into contact only with the black solid, in any of the examples, the thickening of halftone dots was suppressed, and the print density improvement effect only on the selective black solid was observed. In particular, the smaller the surface roughness Ra, the higher the print density improvement effect by smoothing. When a comparison was made with the same level of surface roughness, by setting the surface free energy of the upper surface of the impression part to 36 mN/m or more, the ink adhered to the impression part side, and the print density improvement effect could be more effectively obtained (comparison between Example 5 and Example 6). In addition, by setting the surface free energy to 50 mN/m or less, it was possible to reduce the tendency that the ink was taken on the impression part side and the concentration decreased (comparison between Example 1 and Example 8). Table 2 shows the results.

Examples 9 to 13

Printing was performed by Printing method 2 while only the printing pressure between the impression cylinder and the impression drum was changed from the conditions of Example 1. With all the impression parts being selectively installed only for the black solid, in any of the examples, the thickening of halftone dots was suppressed, and the print density improvement effect only on the selective black solid was observed. As the pressure increased, the contact pressure between the impression part and the black solid increased, so that the print density tended to improve. Meanwhile, the contact pressure between the blanket and the halftone-dot portion also increased, so that the dot gain also tended to increase. At 600 $N/cm^2$ or more, there is no large difference in print density, and it is considered that the printing pressure is sufficient. Table 3 shows the results.

Example 14 and Comparative Example 4

Printing was performed by Printing method 3 using Impression cylinders 1, 14 shown in Table 1 for the impression process of the seventh cylinder in Example 14 and Comparative Example 4 in the corresponding order. Also, in Example 14 corresponding to surface printing, with all the impression parts being patterned so as to selectively come into contact only with the black solid, the thickening of halftone dots was suppressed, and the print density improvement effect only on the selective black solid was observed. In addition, the print density improvement effect was larger than that by the impression pressure applied by the impression cylinder of only the blanket material in Comparative Example 4. The black solid of the printed material obtained in Example 14 had an Ra of 0.47 μm and excellent smoothness as compared with Comparative Example 4, and the gloss of the printed material was as good as 51. In addition, since the ink was active energy ray-curable ink, the film was hard and had good scratch resistance. The printed material of Comparative Example 4 had good scratch resistance, but the surface roughness of the solid was as large as 1.04 μm, and the gloss of the printed material was as poor as 33. Table 4 shows the results.

Examples 15 and 16 and Comparative Example 5

Printing was performed by Printing method 5 using the impression cylinders 9, 10, 14 shown in Table 1 for the impression process of the third cylinder in Examples 15 and 16 and Comparative Example 5 in the corresponding order. Even in a complicated image having many halftone-dot portions, by using an impression cylinder having an appropriately patterned impression part, the thickening of halftone dots was suppressed, and the effect of improving the print density on only the selective black solid was observed, as in Example 15. In addition, the print density improvement effect was larger than that by the impression pressure applied by the impression cylinder of only the blanket material in Comparative Example 5. Further, comparing Example 15 using the waterless lithographic printing original plate (Member 6 of the impression part) as the member of the impression part with Example 16 using the resin letterpress (Member 7 of the impression part), there was observed a preferable tendency that Example 15 using the waterless printing plate with a low surface roughness Ra had a high print density and a dot gain of the 50% halftone dots close to 14%. Table 5 shows the results.

Example 17 and Comparative Example 6

Printing was performed by Printing method 7 using the impression cylinders 9 and 14 shown in Table 1 for the impression process of the third cylinder in Example 17 and Comparative Example 6 in the corresponding order. As in Example 15, even in a complicated image having many halftone-dot portions, the thickening of the halftone dots was suppressed by using an appropriately patterned impression cylinder, and the print density improvement effect only on the selective black solid was observed. In Example 17, since the impression part does not come into contact with the halftone-dot portion, an increase in the dot gain could be suppressed as compared with Comparative Example 6 with the impression cylinder including only the blanket material. Table 5 shows the results.

Comparative Example 7

Printing was performed by Printing method 5 in which impression throw-in was not performed on the third cylinder for the impression process in Printing method 4 (Example 15). Compared to Example 15, since impression throw-in for the impression process was not performed, there was no smoothing effect on the printed material. Table 5 shows the results.

Examples 18 and 19 and Comparative Examples 8 and 9

In Example 18, printing was performed by Printing method 6 using Impression cylinder 12 for the impression process of the third cylinder and Impression cylinder 9 for the impression process of the seventh cylinder. In Example 19, printing was performed by Printing method 6 using Impression cylinder 12 for the impression process of the third cylinder and Impression cylinder 11 for the impression process of the seventh cylinder. In Comparative Example 8, printing was performed by Printing method 6 using Impression cylinder 14 for the impression process of the third and seventh cylinders. In Comparative Example 9, printing was performed by Printing method 6 using Impression cylinder 13 for the impression process of the third and seventh cylinders. In Examples 18 and 19, for the image with the black ink, each impression part in the impression cylinder of the seventh cylinder was patterned so as to selectively apply impression pressure only to the black solid (so as to avoid the black dot portion). Therefore, the thickening of the halftone dots was suppressed, and the print density improvement effect only on the selective black solid was observed. Further, in Example 19, the impression part was patterned also at the place corresponding to the white solid in the impression cylinder of the seventh body, so that the solid of the printed material showed a further smoothing effect with an Ra of 0.32 μm, and the gloss of the printed material was very good at 60. In addition, since the ink was active energy ray-curable ink, the film was hard and had good scratch resistance. In the printed material of Comparative Example 8, the scratch resistance was good, but the surface roughness of the solid was as large as 1.02 μm, and the gloss of the printed material was as poor as 33. In the printed material of Comparative Example 9, the gloss of the printed material was as very good at 57 due to the entire surface being smoothed, but the dot gain of the halftone-dot portion was as poor as 27%, and gradation expressivity was not compatible. Table 6 shows the results.

Reference Example 1 (Gravure Surface Printing)

Images similar to those printed in Printing method 6 (Examples 18 and 19 and Comparative Examples 8 and 9) were printed by gravure surface printing. The gravure printed material of Reference Example 1 had a small surface roughness of 0.26 μm and very good glossiness, but the film was flexible, and hence the scratch resistance was insufficient. Table 6 shows the results.

TABLE 2

| | Example 1 | Example 2 | Example 3 | Example 4 | Example 5 | Example 6 | Example 7 | Example 8 |
|---|---|---|---|---|---|---|---|---|
| Impression cylinder | 1 | 2 | 3 | 4 | 5 | 6 | 7 | 8 |
| Printing method | 2 | 2 | 2 | 2 | 2 | 2 | 2 | 2 |
| Printing pressure (N/cm$^2$) | 420 | 440 | 440 | 430 | 430 | 420 | 430 | 430 |
| Printing density of black ink | 1.76 | 1.72 | 1.65 | 1.81 | 1.68 | 1.73 | 1.62 | 1.61 |
| Dot gain (%) of 50% halftone dots | 16 | 15 | 14 | 18 | 17 | 17 | 15 | 14 |
| Peeling of base material | ○ | ○ | ○ | ○ | x | ○ | ○ | Δ |

TABLE 3

| | Example 9 | Example 10 | Example 11 | Example 12 | Example 13 | Comparative Example 1 | Comparative Example 2 | Comparative Example 3 |
|---|---|---|---|---|---|---|---|---|
| Impression cylinder | 1 | 1 | 1 | 1 | 1 | 13 | 14 | — |
| Printing method | 2 | 2 | 2 | 2 | 2 | 2 | 2 | 1 |
| Printing pressure (N/cm$^2$) | 130 | 240 | 630 | 730 | 990 | 440 | 430 | — |
| Printing density of black ink | 1.61 | 1.68 | 1.79 | 1.83 | 1.82 | 1.79 | 1.58 | 1.40 |
| Dot gain (%) of 50% halftone dots | 13 | 15 | 17 | 19 | 20 | 24 | 15 | 11 |
| Peeling of base material | ○ | ○ | ○ | ○ | ○ | ○ | — | — |

TABLE 4

| | Example 14 | Comparative Example 4 |
|---|---|---|
| Impression cylinder | 1 | 14 |
| Printing method | 3 | 3 |
| Printing pressure (N/cm$^2$) | 420 | 420 |
| Printing density of black ink | 1.75 | 1.55 |
| Dot gain (%) of 50% halftone dots | 16 | 14 |
| Peeling of base material | ○ | — |

TABLE 4-continued

| | Example 14 | Comparative Example 4 |
|---|---|---|
| Surface roughness Ra (μm) of solid of printed material | 0.47 | 1.04 |
| Gloss value of solid of printed material | 51 | 33 |
| Young's modulus (GPa) of ink-cured film | 3.4 | 3.4 |
| Scratch resistance of printed material | ○ | ○ |

TABLE 5

| | Example 15 | Example 16 | Example 17 | Comparative Example 5 | Comparative Example 6 | Comparative Example 7 |
|---|---|---|---|---|---|---|
| Impression cylinder | 9 | 10 | 9 | 14 | 14 | — |
| Printing method | 5 | 5 | 7 | 5 | 7 | 4 |
| Printing pressure (N/cm$^2$) | 380 | 380 | 390 | 390 | 390 | — |
| Printing density of black ink | 1.68 | 1.65 | 1.70 | 1.54 | 1.65 | 1.40 |
| Dot gain (%) of 50% halftone dots | 15 | 18 | 18 | 15 | 19 | 11 |
| Peeling of base material | ○ | ○ | ○ | — | — | — |

TABLE 6

| | Example 18 | Example 19 | Comparative Example 8 | Comparative Example 9 | Reference Example 1 |
|---|---|---|---|---|---|
| Impression cylinder (3rd cylinder) | 12 | 12 | 14 | 13 | — |
| Impression cylinder (7th cylinder) | 9 | 11 | 14 | 13 | — |
| Printing method | 6 | 6 | 6 | 6 | — |
| Printing pressure (N/cm$^2$) | 390 | 390 | 390 | 400 | — |
| Printing density of black ink | 1.73 | 1.74 | 1.56 | 1.73 | 1.78 |
| Dot gain (%) of 50% halftone dots | 16 | 15 | 16 | 27 | 32 |
| Peeling of base material | ○ | ○ | — | ○ | — |
| Surface roughness Ra (μm) of solid of printed material | 0.43 | 0.32 | 1.02 | 0.42 | 0.26 |
| Gloss value of solid of printed material | 55 | 60 | 33 | 57 | 64 |
| Young's modulus (GPa) of ink-cured film | 3.5 | 3.6 | 3.6 | 3.6 | 1.4 |
| Scratch resistance of printed material | ○ | ○ | ○ | ○ | x |

DESCRIPTION OF REFERENCE SIGNS

1, 3: Image with black ink
2, 4: Image with white ink
5: Place where ink smoothing material is pasted
6: Place where ink smoothing material is not pasted
D: Printing direction
N: Non-printing portion
$B_s$: Black solid
$W_s$: White solid
$B_{50}$: 50% black halftone-dot portion

The invention claimed is:

1. A method for producing a printed material, the method comprising, in order:

a transfer process of:

supplying ink to a plate cylinder with a printing plate;

transferring the ink to a blanket cylinder upon the blanket cylinder making contact with the plate cylinder;

transferring the ink from the blanket cylinder to a transfer target surface of a substrate to produce an image with the ink, wherein the image has a solid portion and a halftone-dot portion; and an impression process of bringing each of at least one impression cylinder having a member of an impression part into contact with the transfer target surface to which the ink is transferred from the blanket cylinder, wherein at least one member of the impression part has a patterned impression part that makes contact with the transfer target surface; and wherein upon contacting with the transfer target surface of the substrate, the patterned impression part smooths the solid portion but does not smooth the halftone-dot portion.

2. The method for producing a printed material according to claim 1, wherein an impression pressure forms between the at least one impression cylinder having the patterned impression part and an impression drum that faces the at least one impression cylinder having the patterned impression part is 100 $N/cm^2$ or more and 700 $N/cm^2$ or less, wherein said impression pressure sandwiches the substrate with the at least one impression cylinder.

3. The method for producing a printed material according to claim 2, wherein in the transfer process and the impression process, the impression drum is a single impression drum that faces a transfer cylinder for transferring ink and the at least one impression cylinder, and the impression drum sandwiches the substrate with the transfer cylinder and the at least one impression cylinder.

4. The method for producing a printed material according to claim 1, wherein a surface roughness Ra of the upper surface of the patterned impression part is 0.30 μm or less.

5. The method for producing a printed material according to claim 1, wherein a surface roughness Rz of the upper surface of the patterned impression part is 2.00 μm or less.

6. The method for producing a printed material according to claim 1, wherein surface free energy of the upper surface of the patterned impression part is 36 mN/m or more and 50 mN/m or less.

7. The method for producing a printed material according to claim 1, wherein the at least one impression cylinder having the patterned impression part is a cylinder to which at least one selected from an offset printing plate, a flexographic printing plate, a resin letterpress, and a blanket is attached.

8. The method for producing a printed material according to claim 7, wherein the offset printing plate is a waterless printing plate.

9. The method for producing a printed material according to claim 7, wherein the patterned impression part is an ink smoothing material pasted to the blanket.

10. The method for producing a printed material according to claim 1, the method further comprising an irradiation process of irradiating the ink with an active energy ray after the transfer process and the impression process.

11. The method for producing a printed material according to claim 1, wherein the substrate is a film.

12. The method for producing a printed material according to claim 1, wherein a value of a loss tangent (tan δ) of the ink at 25° C. and a measurement frequency of 10 rad/s in the impression process is 1.0 or more and 4.0 or less.

13. The method for producing a printed material according to claim 1, wherein the transfer process is performed a plurality of times, and ink used in at least the performed first transfer of the plurality of times is at least one of white ink and anchoring ink.

14. The method for producing a printed material according to claim 1, the method further comprising:

a second transfer process after the impression process performed using the at least one impression cylinder having the patterned impression part; and another impression process performed using the at least one impression cylinder having another patterned impression part after the second transfer process.

15. The method for producing a printed material according to claim 1, the method further comprising:

a second transfer process of transferring ink to the transfer target surface of the substrate after the impression process performed using the at least one impression cylinder having the patterned impression part, and thereafter an irradiation process of irradiating the ink with an active energy ray.

* * * * *